(12) United States Patent
Andou et al.

(10) Patent No.: US 6,404,343 B1
(45) Date of Patent: Jun. 11, 2002

(54) WATER LEAKAGE MONITORING APPARATUS

(75) Inventors: Fumio Andou, Hokkaidou; Hiroshi Abe, Kanagawa-ken, both of (JP)

(73) Assignees: ACT LSI Inc., Kanagawa-ken; Aqus Co., Ltd., Hokkaidou, both of (JP)

( * ) Notice: Subject to any disclaimer, the term of this patent is extended or adjusted under 35 U.S.C. 154(b) by 0 days.

(21) Appl. No.: 09/599,727

(22) Filed: Jun. 23, 2000

(30) Foreign Application Priority Data

Jun. 25, 1999 (JP) .......................................... 11-180692

(51) Int. Cl.[7] .............................................. G08B 21/00
(52) U.S. Cl. ................... 340/605; 340/856.4; 73/40.5 A
(58) Field of Search ................................ 340/603, 604, 340/605, 609, 855.6, 856.3, 856.4; 73/40.5 A, 592, 597, 598

(56) References Cited

U.S. PATENT DOCUMENTS

| 4,083,229 A | * | 4/1978 | Anway | 73/40.5 A |
| 5,038,614 A | * | 8/1991 | Bseisu et al. | 73/40.5 A |
| 5,544,074 A | * | 8/1996 | Suzukui et al. | 73/40.5 A |
| 5,675,506 A | * | 10/1997 | Savic | 73/40.5 A |

FOREIGN PATENT DOCUMENTS

| JP | 59-150321 | 8/1984 |
| JP | 1-119732 | 5/1989 |
| JP | 1-119733 | 5/1989 |
| JP | 1-119734 | 5/1989 |
| JP | 1-199131 | 8/1989 |
| JP | 2-3933 | 1/1990 |
| JP | 2-3934 | 1/1990 |
| JP | 2-3935 | 1/1990 |
| JP | 02-088935 | 3/1990 |
| JP | 5-22171 | 3/1993 |
| JP | 06-146346 | 5/1994 |
| JP | 06-186126 | 7/1994 |
| JP | 64-025026 | 1/1999 |

\* cited by examiner

Primary Examiner—Van Trieu
(74) Attorney, Agent, or Firm—Wenderoth, Lind & Ponack, L.L.P.

(57) ABSTRACT

A water leakage detecting apparatus is capable of detecting water leakage of a water pipe precisely and at low cost. The water leakage monitoring apparatus includes vibration/electric converter for converting an acoustic vibration transmitted to a water pipe into an electrical signal. A signal discriminator processes an output signal of the vibration/electric converter to detect a signal of a predetermined band being held below a predetermined level continuously beyond a continuing condition to generate a sound interruption detection signal. A counter counts the number of occurrences of the sound interruption detection signal.

16 Claims, 1 Drawing Sheet

WATER LEAKAGE MONITORING APPARATUS

BACKGROUND OF THE INVENTION

1. Field of the Invention

The present invention relates to a water leakage monitoring apparatus, and more particularly to a water leakage monitoring apparatus which converts an acoustic vibration transmitted to a water pipe into an electric signal and presents data for making judgment whether water leakage is being caused or not on the basis of the electric signal.

2. Related Art

Social Background

Clean water to be used as drinking water or the like is distributed to every house through a feed water pipe branched from a distributing pipe. The distributing/feed water pipes (water pipe) have significant deterioration, and water leakage associated therewith is becoming a serious social problem. It has been said that current water leakage amounts reach more than or equal to 10% of the amount of water distributed as clean water. In every summer, a water shortage is caused around metropolitan areas. For compensating for the amount of water lost by water leakage, new service water resources have to be developed, incurring huge costs and significantly influencing the natural environment of the water source.

Accordingly, it has been required to quickly repair leaking portions of the water pipe to eliminate the loss of precious water resources. For this purpose, it is important to monitor the condition of the water pipe sequentially over a wide area to quickly detect water leakage.

Conventional Water Leakage Monitoring and Detecting Technology

Conventionally, water leakage in the water pipe has been detected by a man directly listening to an acoustic vibration transmitted to the water pipe. Water leakage inspection is performed at a time, such as midnight, when there is less traffic and use, and the amount of water becomes small, so as to avoid confusing acoustic vibration due to noise and normal water flow. Then, the water pipe, buried underground, is traced according to an installation map to make a judgment whether water leakage is present or not by listening by means of a stethoscope fitted on the ground or directly on the surface of the water pipe by a professional engineer to an acoustic vibration transmitted to the water pipe. However, in this method, the working hours are limited and the range of the water pipe to be inspected is quite narrow. Therefore, a huge amount of time is taken for identifying the water leaking portion from the wide inspection range. This makes it impossible to catch up on the certainly progressing deterioration of the water pipe. On the other hand, it is possible that water leakage cannot be detected certainly with the skill of the engineer performing the inspection.

Therefore, Japanese Unexamined Patent Publication No. Heisei 5-296824 (first prior art), Japanese Unexamined Utility Model Publication No. Heisei 6-12564 (second prior art), Japanese Unexamined Patent Publication No. Heisei 6-146346 (third prior art) and so on disclose technologies for water leakage monitoring apparatus which can detect water leakage automatically.

The first prior art converts a vibration transmitted to a pipe line, such as the water pipe, into an electrical signal and preliminarily stores a pattern of the electrical signal by adding an allowable range to an electrical signal corresponding to a vibration in the condition where a fluid is not flowing through the pipe line, as a noise component. Then, the electrical signal pattern while the fluid flows through the pipe line is compared with the noise component to make a judgment that water leakage is occurring when an electrical signal pattern different from normal fluid flow condition is detected.

On the other hand, the second prior art compares a water amount flowing in the water pipe indicated by a water meter interposed in the feed water pipe of each house with a preliminarily set water leakage amount to make judgment that water leakage is occurring when the water amount indicated by the water meter exceeds a set amount of the water leakage amount. Also, the third prior art monitors the water consumption amount output from the water meter and the vibration caused due to water flow and transmitted to the water pipe so as to make a judgment that water leakage is occurring when the vibration of the water pipe is detected while the meter does not show a consumption amount, i.e. water service is not in use.

The foregoing first prior art is basically directed to a water leakage monitoring apparatus in the water pipe for cooling a plant, and requires preliminary storage of the signal pattern of the environmental noise under the condition where water is not flowing. Therefore, it is difficult to apply this technology for an already-installed water pipe. On the other hand, a complicated digital data process, such as signal pattern recognition and so forth, is required and makes the apparatus per se expensive. Huge costs are inherently incurred if a large number of these apparatuses are installed for identifying the portion causing water leakage from the water pipe installation range.

The second prior art is water leakage monitoring technology for the case of an absence for a long period of time, such as with a cottage, and is premised on no water service being used while absent. Then, the water leakage of the water pipe on the inside of the building can be detected from the water meter. Accordingly, it is not applicable for that detection of water leakage in a general water pipe, to which the present invention directed.

The third prior art is premised on no environmental vibration due to ambient noise or environmental vibration due to traffic occurring when the water meter does not indicate water flow. Conversely, it is possible that the water service is used even in at midnight, when environmental vibrations are small. Therefore, the probability of detection of the water leakage is low, causing difficulties in quickly taking a measurement.

Here, considering the conventional water leakage detection method, it should be appreciated that the prior art judges that water leakage is occurring on the basis of obtaining certain information due to water leakage. However, in the current social environment, the water service is used day and night, and it is not likely that noise and vibration due to traffic or other reasons is interrupted for a long period. Therefore, it is difficult for the conventional water leakage detection technology to achieve leakage detection over a wide area, quickly and at low cost.

SUMMARY OF THE INVENTION

Therefore, the present invention has been worked out focusing on the fact that water leakage is continuous at a constant water flow rate without interruption, and normal water flow in use of city water is intermittent/irregular. Then, if the water pipe is in normal condition, vibration to be transmitted to the water pipe is intermittent/irregular. Therefore, an inference is made that the possibility that water leakage is occurring is quite low if no vibrating condition is detected, even for a short period in the order of several seconds. The cogency of this approach has been confirmed with a large number of experiments. As a result, the following invention has been made.

According to a first aspect of the invention, a water leakage monitoring apparatus comprises a vibration/electric converter for converting an acoustic vibration transmitted to a water pipe into an electrical signal. A signal discriminator processes an output signal of the vibration/electric converter to detect a signal of a predetermined band being held below a predetermined level continuously beyond a continuing condition so as to generate a sound interruption detection signal. A counter counts the number of occurrences of the sound interruption detection signal.

In a second aspect of the invention, the water leakage monitoring apparatus comprises a display for outputting a display of a count value of the counter. Accordingly to a third aspect of the invention, the water leakage monitoring apparatus comprises signal output for outputting the count number of the counter in the form of a data signal.

According to a fourth aspect of the invention, the water leakage monitoring apparatus comprises a manual reset for resetting the counter in response to a manual switch operation. In a fifth aspect of the invention, the water leakage monitoring apparatus comprises a timer circuit measuring time, and an automatic reset for storing the count value of the counter in a predetermined memory area in predetermined monitoring cycles and resetting the counter.

In a sixth aspect of the invention, the water leakage monitoring apparatus comprises a timer circuit for measuring time, water leakage judgment means for making a judgment as to whether water leakage is caused or not on the basis of times of occurrence of the sound interruption detection signal in predetermined monitoring cycles, a judgment result storage for storing the result of judgment by the judgment means for the predetermined cycles in a predetermined memory area, and a judgment result output for outputting the judgment result stored in the storage in display output or in the form of a data signal.

In a seventh aspect of the invention, the water leakage monitoring apparatus comprises a timer circuit for measuring time, water leakage judgment means for making a judgment that water leakage is not caused when the number of occurrences of the sound interruption detection signal is more than or equal to a predetermined number of times and making a judgment that water leakage is caused when the number of occurrences of the sound interruption detection signal is less than the predetermined number of times, a judgment result storage for storing the result of the judgment by the judgment means for predetermined cycles in a predetermined memory area, and a judgment result output device for outputting the judgment result stored in the storage in a display output or in the form of a data signal.

In an eighth aspect of the invention, the water leakage monitoring apparatus comprises a timer circuit operated constantly for measuring time, and an intermittent operation controller operated constantly together with the timer circuit for enabling other circuits by intermittently supplying operational power for other circuits on the basis of a predetermined time schedule.

In a ninth aspect of the invention, the water leakage monitoring apparatus comprises a controller for interrupting the operation of the monitoring cycle during detection of the sound interruption detection signal in certain monitoring cycles for predetermined times to halt the cycle.

BEST MODE FOR IMPLEMENTING THE INVENTION

Outline of Water Leakage Monitoring Apparatus

Figure 1:
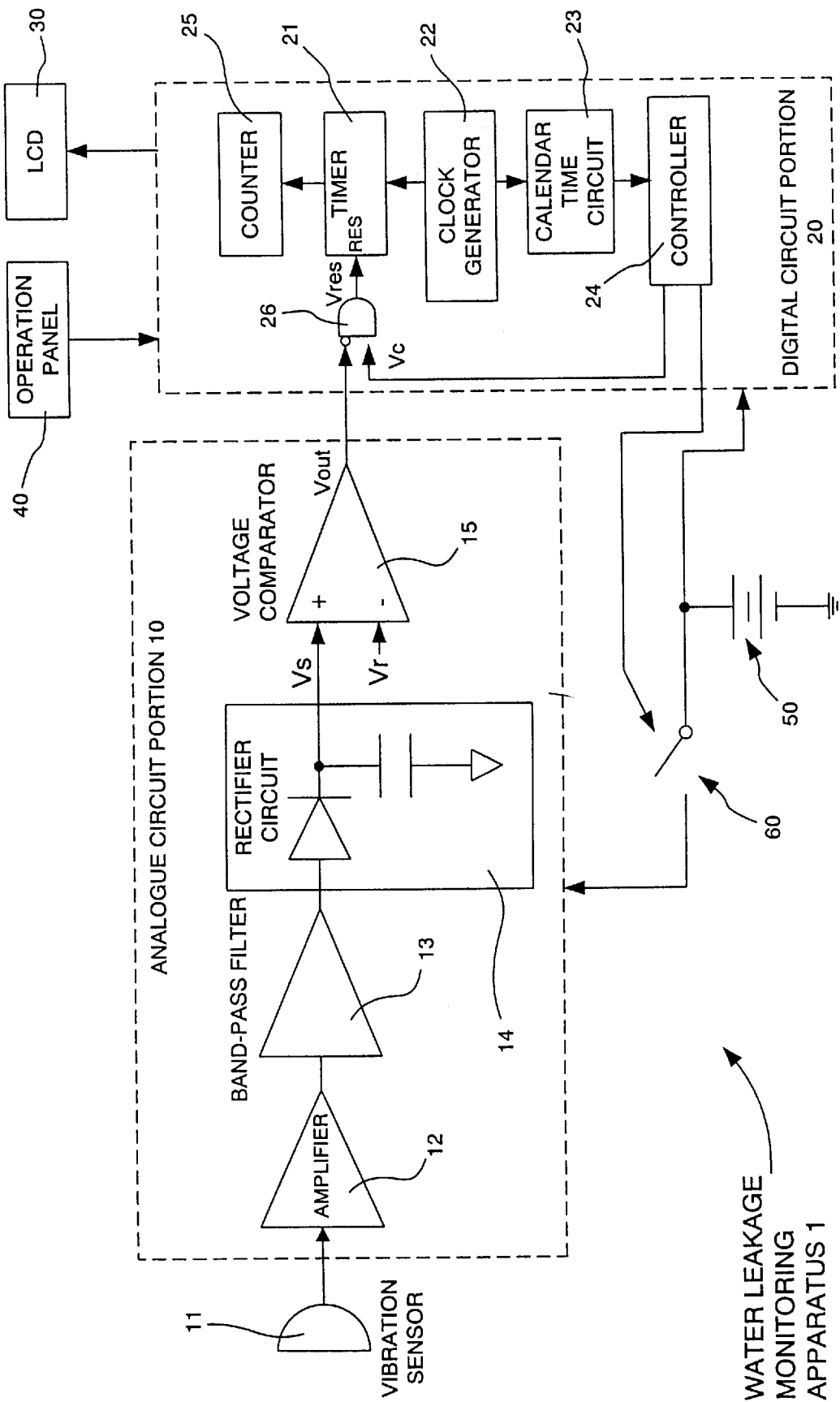
FIG. 1 is an illustration showing a general construction of an embodiment of a water leakage monitoring apparatus according to the present invention.

To a water pipe, various acoustic vibrations, such as a vibration due to water flow by consumption of water, a vibration due to water flow caused by water leakage, an environmental vibration such as ambient noise and the like, and other vibrations are transmitted. If the acoustic vibration is interrupted, a judgment can be made that water flow due to water leakage is not caused in the water pipe. A water leakage monitoring apparatus according to the present invention presents a structure for making a judgment whether water leakage is caused or not by outputting the frequency of interruption of vibration to be transmitted to the water pipe in an appropriate data format.

Construction and Operation of Water Leakage Monitoring Apparatus

FIG. 1 is a schematic block diagram showing a construction of an embodiment of a water leakage monitoring apparatus according to the present invention. This water leakage monitoring apparatus (hereinafter referred to as "apparatus") 1 is used by installing it in a water pipe installed in each house. In the illustrated embodiment, the apparatus is installed in the vicinity of a water meter in the water pipe on a water feeding side. Of course, it is possible to install the apparatus in the water pipe on a drainage side for monitoring water leakage in a sewage flow path.

The apparatus 1 is operated by an internal power source 50, such as a lithium battery. A circuit construction of the apparatus is generally separated into a digital circuit portion 20 operated constantly and an analog circuit portion 10 operated intermittently under control oft he digital circuit portion 20, depending upon the signal aspect to be processed and signal processing function. The apparatus also includes a liquid crystal display (LCD) 30 for the display of data corresponding to a result of monitoring of the water pipe and an operation panel 40 for performing various setting input (which will be discussed later).

In the illustrated embodiment, the analog circuit portion 10 and the digital circuit portion 20 are formed with one-chip ICs, respectively. However, it is also possible to have a construction in which circuit elements of the respective analog and digital signal processing systems are packed within a one-chip IC. Of course, part of or all of the circuit elements may be formed with independent elements. Next, a particular circuit construction and operation will be discussed.

Analog Circuit Portion

A vibration sensor 11 is mounted on the surface of the water pipe and converts an acoustic vibration transmitted to the water pipe into an extremely low level electrical signal (acoustic signal). The analog circuit portion 10 is a processing system for this acoustic signal. The acoustic signal output from the vibration sensor 11 is amplified by an amplifier 12. A band-pass filter 13 cuts off a signal of a frequency band unnecessary for distinguishing water flow sound, such as a high frequency band from the amplified signal. A rectifier circuit 14 performs envelope detection of the acoustic signal passed through the filter 13. A rectified output Vs is compared with a predetermined reference voltage value Vr by a voltage comparator 15. Then, when Vs>Vr, Vout as a predetermined voltage signal (High level:H) is output, and when Vs<Vr, Vout of a Low level (L) is output. It should be noted that the occurrence or stop of momentary vibrations is not related to the occurrence and stop of vibration in terms of detection of water leakage. It may be possible to provide an additional circuit for ignoring momentary variation of the acoustic signal by setting an appropriate time constant.

Digital Circuit Portion

The digital circuit portion 10 controls the foregoing analog circuit portion 10 according to a predetermined time schedule, and also outputs data for displaying a count value by counting the number of times of occurrence of interruption of vibration transmitted to the water pipe on the basis of the Vout signal output from the analog circuit portion 10.

A calendar circuit 23 is driven by a clock pulse from a clock generator 22 and monitors a current date and time. A controller 24 stores data corresponding to a plurality of times in a register to perform operation for intermittently closing a switch 60 according to a predetermined schedule corresponding to a plurality of time data by obtaining time data from the calendar circuit 23.

By this, the analog circuit portion 10 is operated by supplying power every time at which the controller 24 closes the switch. In the illustrated embodiment, one day (24 hours) is taken as one monitoring cycle, and the three hours of 2:00 am to 5:00 am, in which normal water flow and environmental vibration is relatively small, are taken as a measuring period. During the measuring period, an operation period of 2 seconds is set for every 3 minutes. Namely, everyday, at 2:00 am, 2 seconds of operation and 2 minutes and 58 seconds of interval, 2 seconds of operation again, then, 2 minutes and 58 seconds of interval . . . occur. This operation is repeated up to 5:00 am, and then measurement of the relevant date (monitoring cycle) is terminated. Then, at 2:00 am of the next day, the same operation is performed. It should be noted that the controller 24 also performs an operation for setting a control signal Vc H associated with closing of the switch 60.

The timer 21 measures time by counting the clock pulse from the clock generator 22. When a predetermined period is measured, one pulse, as a sound interruption detection signal, is output. Then, by this pulse, the counter 25 is incremented. In the illustrated embodiment, in the timer 21, the number of clock pulses for about 2 seconds is stored in the register. When the number of pulses is counted, the counter 25 is incremented. On the other hand, the timer also performs an operation for resetting time measurement by receiving a H level reset signal Vres via an AND circuit 26. In the shown embodiment, the AND circuit 26 receives an inverted signal of Vout and Vc. When Vc is H and Vout signal is L, the reset signal becomes L. Then, the timer 21 counts the clock pulse. Accordingly, when the vibration transmitted to the water pipe is maintained to be lower than or equal to a predetermined level during 2 seconds of operation period of the analog circuit portion 10, the timer 21 outputs the sound interruption detection signal, and the counter 25 is incremented. It should be noted that the number of clock pulses stored in the register of the timer 21 is set to be slightly shorter than 2 seconds in consideration of a delay period up to outputting of Vout from initiation of operation of the analog circuit portion 10 or a delay period up to actually initiation of the counting of the clock pulse by the timer from turning Vres into L.

User Interface

The water leakage monitoring apparatus 1 has the LCD 30 and the operation panel 40 as user interfaces. The LCD 30 converts data transferred from the digital circuit portion 20 into display data for appropriate display output. The operation panel 40 is provided with various keys and appropriately transfers an input signal to each circuit in the digital circuit 20 depending upon the key operation.

For example, when a predetermined key operation is performed by the operation panel 40, the count value integrated in the counter 25 is displayed on the LCD 30. Furthermore, the operation panel 40 resets the integrated count value and modifies time data stored in the controller 24 or the calendar circuit 23 receiving the user input for resetting a measurement schedule or current date and time. Then, on the LCD 30, its set time data and so forth is appropriately displayed.

Operation of Water Leakage Monitoring Apparatus and Judgment of Presence or Absence of Water Leakage As set forth above, if the vibration transmitted to the water pipe is lower than or equal to the predetermined level during 2 seconds of operation period of the analog circuit portion 10, it is integrated in the counter 25 as a number of times of interruption of vibration. In the illustrated embodiment, a judgment whether water leakage is happening in the water pipe or not is made manually on the basis of a numeric value integrated in the counter 25. For example, an inspection time is provided at predetermined periods, such as once a month, and at the inspection time, personnel visit the installation site of the apparatus 1 to display the count value on the LCD 30. The personnel check the integrated count value and reset the counter 25. Since the analog circuit portion 10 outputs H level Vout signal almost continuously if water leakage is present, the timer 21 cannot increment the counter 25. Therefore, if the count value is smaller than the preceding inspection time, a judgment can be made that the water pipe causes water leakage in the vicinity of the apparatus 1. In the alternative, a provision that water leakage is determined when the count value is less than or equal to a predetermined value can be provided for making the judgment. If the water leakage is as set forth above, it can be appreciated that a water leakage portion is present within a quite narrow range in the vicinity of the apparatus 1. Measurements can be quickly taken for a particular operation or repair of the water leakage portion, subsequently.

While the illustrated embodiment uses the water leakage monitoring device according to the present invention for detecting water leakage in the water pipe for clean water, it is of course applicable for detecting water leakage (liquid leakage) in a miscellaneous water system, a sewage system or a pipe line in a plant.

In the embodiment set forth above, the analog circuit portion is operated intermittently for low power consumption. Due to this, the exchange of the power source becomes unnecessary for a long period (7 to 8 years), thus realizing a maintenance-free apparatus. Of course, by using an IC dedicatedly designed for each circuit element, it becomes possible to make the power consumption quite small so as to continuously operate during the measuring period or to continuously operate constantly. It should be noted that an operation schedule of the analog circuit portion can be freely set by appropriately modifying the time data stored in the controller.

It is also possible to feed back the sound interruption detection signal output by the timer to the controller to halt the closure operation of the switch. For example, when the sound interruption detection signal is output twice (when the counter 25 is incremented only twice), the operation in the measuring period is terminated to halt the analog circuit portion until the measuring period of the next monitoring cycle. By this, power consumption can be further restricted. On the other hand, when measuring chances correspond to the number of occurrence of the sound interruption detection signal, and the number of occurrences is displayed at inspection time, the number of days (number of monitoring cycles) where vibration is interrupted can be seen by dividing the number of times by predetermined times for halting.

In the embodiment set forth above, the number of occurrences of the sound interruption detection signal is displayed on the LCD at inspection time to manually judge whether the water leakage is present or absent. It is also possible to not only present the number of occurrences of the sound interruption detection signal, but also present data closer to judgment of the presence or absence of water leakage. For example, when the sound interruption detection signals produced for times greater than or equal to the predetermined times is detected in one monitoring cycle, a judgment is made that water leakage is not caused, and if smaller, a judgment is made that water leakage is caused. In the alternative, if the sound interruption detection signal is not detected for the times more than or equal to the predetermined times, even in any monitoring cycle among continuous monitoring cycles of two to three cycles, a judgment is made that water leakage is happening. Furthermore, such judgment result is appropriately stored in the storage portion. At this time, it may be possible to establish a correspondence with the occurrence date and time of the sound interruption detection signal. Then, by displaying the contents stored in the storage portion on the LCD, the number of days where water leakage is not caused, or the tendency of occurrence of sound interruption detection signal, can be seen to certainly judge the presence or absence of water leakage.

It is also possible to record the occurrence of the sound interruption detection signal or the result of judgment for predetermined monitoring cycles for automatically resetting the count number or the result of judgment. By this, upon inspection time, a particular monitoring condition of the water pipe can be presented as a history.

In order to perform a judgment of water leakage or process and operation for recording the history, it can be simply achieved by forming the digital circuit portion by combining appropriate logic ICs. Of course, in the digital circuit portion, a microcomputer including a CPU, RAM, and ROM can be used. In this case, by preliminarily writing a program describing output condition of the sound interruption detection signal (data) or control schedule of the analog circuit portion in ROM, the CPU detects the sound interruption detection signal according to the program to record the detection date and time in RAM. Furthermore, the presence or absence of the water leakage is judged depending upon the record to transfer the contents of the judgment to the LCD in response to user input through the operation panel.

In the illustrated embodiment, the number of times of the sound interruption detection signal is output by displaying it on the LCD. However, the display should not be limited to an LCD. It can be replaced with an electronic display of LED, EL and so forth, a mechanical type display, such as a magnet inversion type display device using a solenoid, or so forth. It should be noted that the display output may restrict power consumption by performing the display output manually upon inspection time.

On the other hand, it is also possible to output data of a predetermined format instead of display a output. It then becomes possible to use a scheme in which, by providing a communication interface for data output in the water leakage monitoring apparatus, the interface and a portable terminal of the inspection engineer are connected for displaying an output of received data on the display of the terminal or storing in a storage device of the terminal. Of course, it is also possible to perform a transfer operation to other information processing devices through a network, such as a telephone line, per a given period.

The water leakage monitoring apparatus of the present invention utilizes the fact that water leakage is continuous at a constant flow amount without interruption. Noise and normal water flow in the use of city water is intermittent/irregular so as to output a sound interruption detection signal. When the vibration transmitted to the water pipe becomes lower than or equal to the predetermined level continuously, the apparatus counts the number of occurrences. Then, depending upon the number of the count, a judgment reference of the presence or absence of leakage is presented. Accordingly, even when vibration due to noise around the water pipe or water flow for consumption is caused day and night, the absence of vibration due to water leakage can be certainly detected as long as the vibration is possibly interrupted, thereby judging whether water leakage is happening. Therefore, water leakage can be detected precisely even with a simple and inexpensive circuit construction.

On the other hand, by displaying number of times of occurrences of a sound interrupted condition, the personnel performing inspection of water leakage may make a judgment of the presence or absence of water leakage by directly observing the number of times. On the other hand, by data output in the predetermined format, data can be used, processed or transferred appropriately.

By providing a means for resetting the number of the count of the sound interruption detection signal, the count number can be checked at every inspection time. Also, by automatically resetting the count number after recording the count number for the predetermined monitoring cycles, it is unnecessary to perform resetting operation manually upon inspection time, and a history of the sound interrupting condition can be checked for each predetermined period.

It becomes possible to directly check water leakage upon inspection time by making a judgment of the presence or absence of water leakage by the count number per monitoring cycle. On the other hand, when the count number for one monitoring cycle does not reach the predetermined value, by making a judgment whether water leakage is present after seeing the result for a predetermined number of monitoring cycles, an erroneous recognition of the presence of water leakage due to continuous vibration caused by noise such as construction can be avoided.

By intermittently enabling other circuits on the basis of a predetermined time schedule by constantly operating the timer circuit, the power consumption can be made low to be of maintenance free, making battery exchange unnecessary. On the other hand, when detecting the sound interruption detection signal in certain monitoring cycles for predetermined times, operation of the monitoring cycle is interrupted to halt the cycle, and power consumption can be made further smaller.

What is claimed is:

1. A leakage monitoring apparatus comprising:
   a vibration/electric converter operable to convert an acoustic vibration transmitted to a pipe into an electrical signal;
   a signal discriminator operable to process the electrical signal of said vibration/electric converter for detecting a signal of a predetermined band being held below a predetermined level continuously beyond a continuing condition to generate a sound interruption detection signal which indicates a probability that no leakage occurs in the pipe; and
   a counter operable to count a number of occurrences of the sound interruption detection signal to obtain a counted value which indicates the probability that no leakage occurs in the pipe.

2. A leakage monitoring apparatus as set forth in claim 1, further comprising a display operable to output a display the counted value of said counter.

3. A leakage monitoring apparatus as set forth in claim 1, further comprising a signal output operable to output the counted value as a data signal.

4. A leakage monitoring apparatus as set forth in claim 1, further comprising a manual reset operable to reset said counter in response to a manual switch operation.

5. A leakage monitoring apparatus as set forth in claim 1, further comprising:
- a timer circuit operable to measure a time; and
- an automatic reset operable to store the counted value of said counter in a predetermined memory area in predetermined monitoring cycles and further operable to reset said counter.

6. A leakage monitoring apparatus as set forth in claim 4, further comprising:
- a timer circuit operable to measure a time; and
- an automatic reset operable to store the counted value of said counter in a predetermined memory area in predetermined monitoring cycles and further operable to reset said counter.

7. A leakage monitoring apparatus as set forth in claim 1, further comprising:
- a timer circuit operable to measure a time;
- leakage judgment means for judging whether or not leakage is occurring based on a number of times of occurrences of the sound interruption detection signal in predetermined monitoring cycles;
- a judgment result storage operable to store a judgment result of said leakage judgment means for the predetermined monitoring cycles in a predetermined memory area; and
- a judgment result output operable to output the judgment result stored in said judgment result storage as a display output or as a data signal.

8. A leakage monitoring apparatus as set forth in claim 1, further comprising:
- a timer circuit operable to measure a time;
- leakage judgment means for judging that leakage is not occurring when a number of occurrences of the sound interruption detection signal is greater than or equal to a predetermined number of occurrences, and for judging that leakage is occurring when the number of occurrences of the sound interruption detection signal is less than the predetermined number of occurrences;
- a judgment result storage operable to store a judgment result of said leakage judgment means for predetermined cycles in a predetermined memory area; and
- a judgment result output operable to output the judgment result stored in said judgment result storage as a display output or a data signal.

9. A leakage monitoring apparatus as set forth in claim 1, further comprising:
- a timer circuit operated constantly, said timer circuit being operable to measure a time; and
- an intermittent operation controller operated constantly together with said timer circuit, said intermittent operation controller being operable to enable other circuits by intermittently supplying an operation power for the other circuits based on a predetermined time schedule as a monitoring cycle.

10. A leakage monitoring apparatus as set forth in claim 4, further comprising:
- a timer circuit operated constantly, said timer circuit being operable to measure a time; and
- an intermittent operation controller operated constantly together with said timer circuit, said intermittent operation controller being operable to enable other circuits by intermittently supplying an operation power for the other circuits based on a predetermined time schedule as a monitoring cycle.

11. A leakage monitoring apparatus as set forth in claim 5, further comprising:
- a timer circuit operated constantly, said timer circuit being operable to measure a time; and
- an intermittent operation controller operated constantly together with said timer circuit, said intermittent operation controller being operable to enable other circuits by intermittently supplying an operation power for the other circuits based on a predetermined time schedule as a monitoring cycle.

12. A leakage monitoring apparatus as set forth in claim 6, further comprising:
- a timer circuit operated constantly, said timer circuit being operable to measure a time; and
- an intermittent operation controller operated constantly together with said timer circuit, said intermittent operation controller being operable to enable other circuits by intermittently supplying an operation power for the other circuits based on a predetermined time schedule as a monitoring cycle.

13. A leakage monitoring apparatus as set forth in claim 9, further comprising a controller operable to interrupt operation of the monitoring cycle at a time of detection of the sound interruption detection signal a predetermined number of times in a certain monitoring cycle to thereby halt the monitoring cycle.

14. A leakage monitoring apparatus as set forth in claim 10, further comprising a controller operable to interrupt operation of the monitoring cycle at a time of detection of the sound interruption detection signal a predetermined number of times in a certain monitoring cycle to thereby halt the monitoring cycle.

15. A leakage monitoring apparatus as set forth in claim 11, further comprising a controller operable to interrupt operation of the monitoring cycle at a time of detection of the sound interruption detection signal a predetermined number of times in a certain monitoring cycle to thereby halt the monitoring cycle.

16. A leakage monitoring apparatus as set forth in claim 12, further comprising a controller operable to interrupt operation of the monitoring cycle at a time of detection of the sound interruption detection signal a predetermined number of times in a certain monitoring cycle to thereby halt the monitoring cycle.

* * * * *